US008298335B2

(12) United States Patent
Armstrong (10) Patent No.: US 8,298,335 B2
(45) Date of Patent: Oct. 30, 2012

(54) ENCLOSURE FOR CONTROLLING THE ENVIRONMENT OF OPTICAL CRYSTALS

(75) Inventor: J. Joseph Armstrong, Milpitas, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 1003 days.

(21) Appl. No.: 12/154,337

(22) Filed: May 6, 2008

(65) Prior Publication Data

US 2012/0160856 A1    Jun. 28, 2012

Related U.S. Application Data

(60) Provisional application No. 61/008,260, filed on Dec. 18, 2007.

(51) Int. Cl.
*C30B 35/00* (2006.01)
(52) U.S. Cl. ......... 117/200; 117/203; 117/204; 117/911
(58) Field of Classification Search ............. 117/204, 117/200, 203, 911
See application file for complete search history.

(56) References Cited

U.S. PATENT DOCUMENTS

| | | | | |
|---|---|---|---|---|
| 4,900,937 A * | 2/1990 | Dayton et al. | ............. | 250/483.1 |
| 5,363,391 A * | 11/1994 | Matthews et al. | ................ | 372/36 |
| 5,796,109 A * | 8/1998 | Frederick et al. | ............. | 250/368 |
| 6,002,697 A * | 12/1999 | Govorkov et al. | ............. | 372/34 |
| 6,359,282 B1 * | 3/2002 | Sekela | ...................... | 250/370.11 |
| 2003/0016349 A1* | 1/2003 | Tsumura et al. | ............ | 356/237.2 |
| 2005/0163173 A1* | 7/2005 | Reid et al. | ........................ | 372/21 |
| 2005/0225837 A1 | 10/2005 | Kojima et al. | | |
| 2007/0177639 A1 | 8/2007 | Tokuhisa et al. | | |
| 2007/0297466 A1* | 12/2007 | Ghorbani et al. | ............... | 372/22 |

FOREIGN PATENT DOCUMENTS

EP          1048974         *  2/2000

* cited by examiner

*Primary Examiner* — Matthew Song
(74) *Attorney, Agent, or Firm* — Smyrski Law Group, A P.C.

(57) ABSTRACT

An enclosure that maintains the environment of one or more optical crystals and allows efficient frequency conversion for light at wavelengths at or below 400 nm with minimal stress being placed on the crystals in the presence of varying temperatures. Efficient conversion may include multiple crystals of the same or different materials. Multiple frequency conversion steps may also be employed within a single enclosure. Materials that have been processed specifically to provide increased lifetimes, stability, and damage thresholds over designs previously available are employed. The enclosure allows pre-exposure processing of the crystal(s) such as baking at high temperatures and allowing real time measurement of crystal properties.

31 Claims, 11 Drawing Sheets

ENCLOSURE FOR CONTROLLING THE ENVIRONMENT OF OPTICAL CRYSTALS

This application claims the benefit of U.S. Provisional Patent Application Ser. No. 61/008,260, entitled "Enclosure for Controlling the Environment of Optical Crystals," inventor J. Joseph Armstrong, filed Dec. 18, 2007, the entirety of which is incorporated herein by reference.

BACKGROUND OF THE INVENTION

1. Field of the Invention

The present invention generally relates to illuminators used in conjunction with inspection systems, such as semiconductor wafer inspection systems and photomask inspection systems, and more particularly to a frequency converted light source for use with such inspection systems.

2. Description of the Related Art

The demands of the semiconductor industry for wafer and photomask inspection systems exhibiting high throughput and improvements in resolution are ongoing. Successive generations of such inspection systems tend to achieve higher resolution by illuminating the wafer or reticle using light energy having shorter wavelengths.

Certain practical advantages may be achieved when illuminating the wafer or reticle with light with wavelengths at or below 400 nm. Providing suitable lasers for high quality wafer and photomask inspection systems is particularly challenging. Conventional lasers generating light energy in the deep ultraviolet (DUV) range are typically large, expensive devices with relatively short lifetimes and low average power. Semiconductor wafer and photomask inspection systems generally require a laser generally having a high average power, low peak power, and relatively short wavelength in order to provide for inspection having sufficient throughput and adequate defect signal-to-noise ratio (SNR).

The primary method to provide adequate DUV power entails generating shorter wavelength light from longer wavelength light. This process of changing wavelengths is commonly called frequency conversion. Frequency conversion in this context requires high peak power light energy production in order to produce a nonlinear response in an optical crystal. To increase the efficiency of this process the longer wavelength light may have high average powers, short optical pulses, and may be focused into the optical crystal. The original light is typically called fundamental light.

High efficiency is important for a DUV laser. High efficiency allows a lower power fundamental laser source that is more reliable, smaller, and produces less heat. A low power fundamental laser will produce less spectral broadening if a fiber laser is used. Higher efficiency also tends to lead to lower cost and better stability. For these reasons, efficient frequency conversion to the DUV is relatively important.

Generating light at wavelengths below 400 nm, and especially below 300 nm can be very challenging. Light sources used for semiconductor inspection require relatively high powers, long lifetimes, and stable performance. Light sources meeting these requirements for advanced inspection techniques are nonexistent. The lifetime, power, and stability of current DUV frequency converted lasers is generally limited by the frequency conversion crystals and conversion schemes, especially those exposed to DUV wavelengths like 355, 266, 213, and 193 nm.

Relatively few nonlinear crystals are capable of efficiently frequency converting light to UV/DUV wavelengths. Most crystals that have traditionally been employed have low damage thresholds if not properly prepared and the operating environment maintained. Thus the crystal has typically been contained within an enclosure to maintain the environment. In order to frequency convert an infrared laser to the DUV, more than one crystal can be employed. When multiple crystals are employed, it can be an advantage to place them all within the enclosure. Crystal alignment complications can result, and it can be difficult to collect and focus light in such an enclosure.

It would therefore be desirable to offer an enclosure that maintains the environment of the optical crystal and allows efficient frequency conversion at wavelengths at or below 400 nm. This efficient conversion may include multiple crystals of the same or different materials. Multiple frequency conversion steps may also be employed within a single enclosure. It is also important that any enclosure use materials that can provide increased lifetimes, stability, and/or damage thresholds as compared with designs previously available. In addition, it is desirable for an enclosure to allow pre-exposure processing of the crystal such as baking at high temperatures and allowing real time measurement of crystal properties.

SUMMARY OF THE INVENTION

According to one aspect of the present design, there is provided an environmentally controlled enclosure comprising a crystal. Multiple crystals may be provided in certain embodiments. The enclosure comprises securing hardware configured to secure the crystal within the enclosure such that temperature changes within the enclosure produce negligible stress on the crystal. The enclosure further includes a window configured to permit light to enter the enclosure and contact the crystal and may include a seal formed between the window and the enclosure.

In certain embodiments, a frame is provided for the enclosure, and an outlet configured to purge gas from the enclosure many be provided. Heating or cooling elements may be provided to control the temperature of the enclosure and the crystal or crystals provided therein, and a temperature reading element may be provided that controls temperature using feedback. The window or windows may be provided at Brewster's angle.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

According to the present design, an enclosure for one or more optical crystals that maintains a desirable environment is provided. The enclosure design allows stable, long lifetime, high power frequency conversion of light to UV/DUV wavelengths. In addition, the same enclosure may be employed to preprocess the crystal(s) before exposing the crystal(s) to frequency conversion light.

Frequency conversion in this design uses at least one optical crystal within an enclosure, but may also utilize more than one crystal. In the case of multiple crystals, the crystals may be made of the same materials or different materials. The multiple crystals may be used to generate multiple wavelengths or increase the frequency conversion efficiency of a single wavelength.

Further, the present design may provide an advanced light source having a novel method for producing light energy. The present design may use nonlinear optical crystals within an enclosure, where the enclosure processes the crystal(s) before use and maintains the environment of the processed crystal during frequency conversion. The enclosure also includes optics for focusing light into crystals and collecting light from crystals. These optics may be external to the enclosure or included within the enclosure.

The present design allows for one or more cells to be used in the current embodiments and each cell may contain one or more crystals. In addition these cells may be translated to focus light through different parts of the crystal. This is typically done to increase the lifetime of a single crystal. The diameter of the light beam focused into the crystal is typically much smaller than the dimension of the crystal cross section. When a particular position in the crystal is damaged, the crystal may be translated to an undamaged region and continue to be used.

A particular aspect of the present design is the ability for the enclosure and crystal to enable heating or cooling of the environment and crystal without placing significant stress or by placing negligible stress on the crystal.

Other embodiments include an enclosure for preexposure processing only. Using one enclosure to preprocess the crystal and another for frequency conversion reduces the risk of crystal contamination from the preexposure process and allows for a simplified frequency conversion enclosure.

Enclosures for Optical Crystals

An enclosure for an optical crystal includes several parts, such as the enclosure frame, hardware to secure the crystal within the frame, windows to allow light in and frequency converted light out, hardware to secure the window to the frame, hardware to seal the window and the frame, and an inlet and outlet for purge gas. Also, it is often desirable to include a heating or cooling element in contact with the enclosure. This heating or cooling element is used to provide a stable temperature for the crystal, i.e. a temperature above or below ambient. The heating or cooling element can also be used to adjust the crystal temperature for preexposure processing. In addition, the enclosure can include hardware enabling adjusting of phase matching angles of the crystal to optimize frequency conversion.

Figure 1:
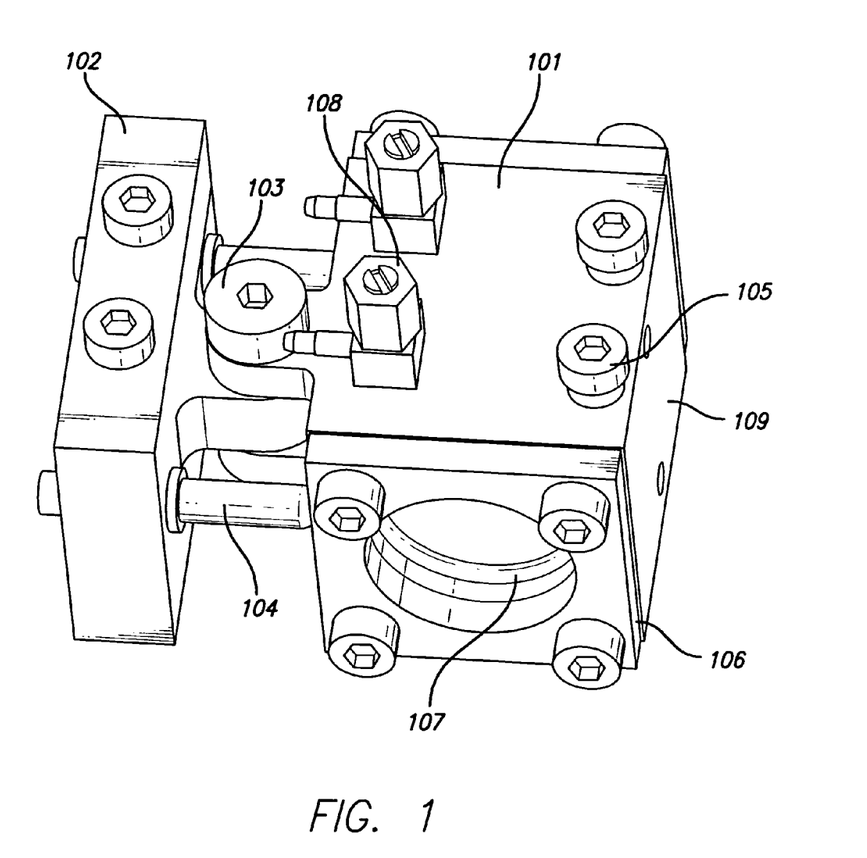
FIG. 1 illustrates an enclosure with built in angle adjustment hinge.

FIG. 1 illustrates an enclosure for an optical crystal. The primary portion of this enclosure is the frame 101. This frame is manufactured using materials and techniques that minimize the impact of photocontamination. Two possible materials that can be used for the frame are aluminum and stainless steel. It is often desirable to coat the material with a layer of nickel to inhibit contaminants within the metal from escaping. It is also desirable to have the frame electropolished and cleaned in order to minimize any remaining surface contamination. It may also be desirable to integrate an angle adjustment mechanism into the frame to allow adjustment of the phase matching angles.

The metal frame 101 may be formed from a variety of metals or materials including but not limited to stainless steel, aluminum, beryllium copper, copper, brass, and/or nickel. The metal frame 101 may be coated with nickel and/or electropolished.

In FIG. 1, a hinge plate 102 is included in the frame, and a hinge rotation pin 103 and adjuster screws 104 are also used to adjust the angle. The angle adjustment works by keeping hinge plate 102 in a fixed position. Fixing bolts 105 are loosened to allow rotation about fixing bolt 103. Rotation is accomplished by turning the push pull adjuster screws 104. When in the proper position, Fixing bolts 105 are locked. FIG. 1 also includes a window within a window holding plate 106. This window may be antireflection coated or may be oriented at Brewster's angle. Both of these techniques may be employed to improve the efficiency of the light transmission.

Providing a window at Brewster's angle requires the window to be mounted in proximity of Brewster's angle. One method to achieve this requires the frame 102 to be machined to support a window at this angle. The window holding plate 106 then fixes the window to the frame. A second method is to add an extension between the frame 101 and the holding plate 106. This extension can mount to the frame 101 at one end and hold the window at Brewster's angle at the other. The windows should be placed far enough away from the crystal so they are not damaged by the light focused into the crystal or the light exiting the crystal. This distance can be calculated based on the light wavelengths, the focusing conditions into the crystal and housing, the crystal type, the window material, the window orientation, and any coatings that may be on the crystal or windows.

A seal 107 that effectively separates the external environment from the internal environment is provided. This seal can be a direct contact between the polished glass and a polished metal surface, or can be a ring of compressive material. This material should withstand high temperatures without significant photocontamination. Two possible compression materials that withstand increased temperatures with minimal outgassing are Viton and Kalrez.

A ring made from a soft metal or a metal ring coated with a soft metal such as silver may be employed. The cross section of the ring can be a circle or a C shape. The seal can also be made in two stages, where a glass to metal seal is used as the primary or inner seal and a ring of compressive material is used as a secondary seal. The design of FIG. 1 also allows for a purge gas in order to maintain the interior environment. This helps remove residual material outgassing and any low level leaking of the external environment into the enclosure.

In certain embodiments, the design may also incorporate a heating or cooling element. This element (not shown) can be attached to surface 109, in proximity to the optical crystal within the enclosure. Possible heating elements that can be easily used are flat elements or cylindrical elements. These elements can be easily attached to the enclosure. A cooling device may also be attached to surface 109. One possible type of cooler is a thermoelectric device which produces a cool surface on one side of the device and a hot surface on the other side when a voltage is applied. Thus this device can be either used to heat or cool. Alternately, a resistive or ceramic heating element may be employed. Heating and cooling can also be accomplished using standard heat exchanger techniques that run hot or cold liquid through a heat exchanging plate in contact with the frame 101. Cooling may also be employed by using, for example, a heat tube or venturi.

Figure 2:
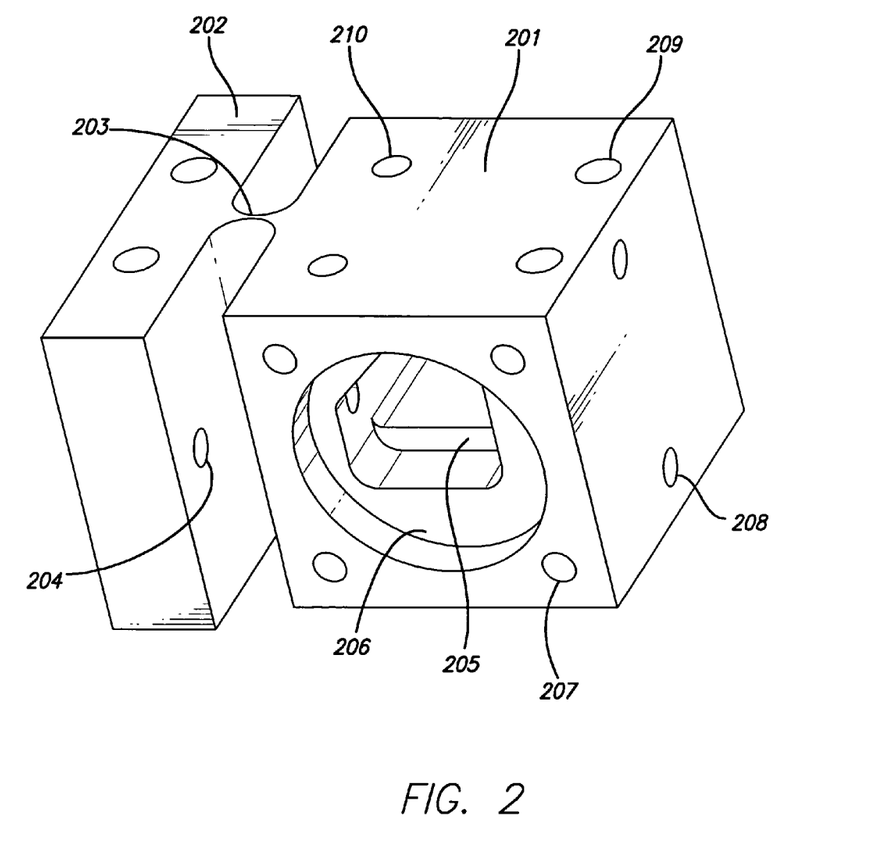
FIG. 2 is a frame with built in angle adjustment flexure.

An alternate design shown in FIG. 2 provides a flexure hinge mechanism for adjusting the optical crystal phase matching angle. In this embodiment, frame 201, adjuster plate 202 and flexure hinge 203 can be fabricated from a single piece of metal. Angle adjustment operation is similar to the embodiment shown in FIG. 1. Frame 201 also includes holes 204 for angle adjustment screws, and a recessed portion 205 that is inside the frame and in contact with the optical crystal. Holder 206 is used for the seal between the frame and the window. Holes 207 are used to secure the window and seal (not shown) to the frame 201. Holes 208 are used to attach heating or cooling element (not shown). Holes 209 are used for fixing bolts (not shown) and holes 210 are used for purge gas entry and exit. The holes are located such that entering purge gas must flow across the faces of the crystal before exiting the enclosure.

Figure 3:
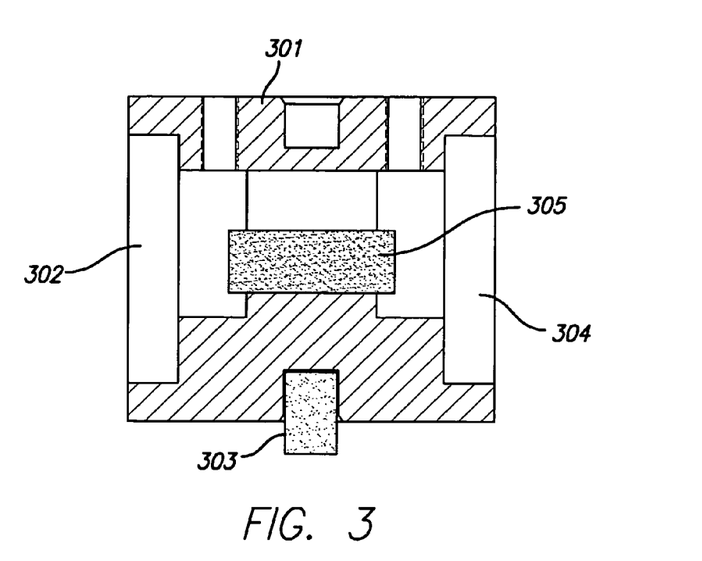
FIG. 3 shows a built in angle adjustment bottom pin.

FIG. 3 illustrates an alternate angle adjustment technique. From FIG. 3, a hole is placed in housing 301 to allow insertion of a rotation pin 303 in the bottom of the frame. The center axis of the pin 303 is generally in proximity to the center of the crystal 305 so the crystal will rotate about its center. Angle adjustment is made using a technique similar to the embodiment in FIG. 1 where the hinge is replaced by the rotation pin 303. In FIG. 3, light may enter through window 302 and exit through window 304. Alternately the light may enter through window 304 and exit through window 302.

Figure 4:
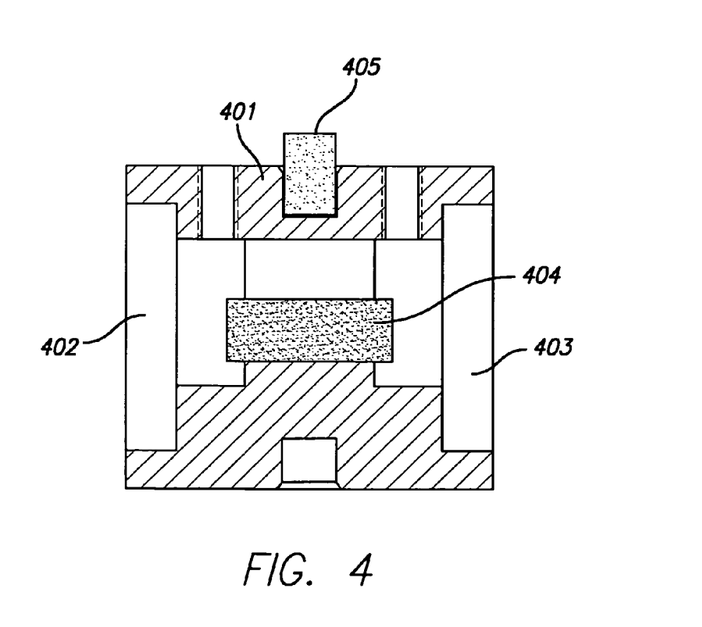
FIG. 4 illustrates a built in angle adjustment top pin.

FIG. 4 illustrates an alternate angle adjustment technique. From FIG. 4, a hole is placed in housing 401 to allow insertion of a rotation pin 403 in the top of the frame. The center axis of the rotation pin 403 is in proximity to the center of the crystal 405 so the crystal will rotate about its center. Angle adjustment is made using a technique similar to the embodiment in FIG. 1 where the hinge is replaced by rotation pin 405. In FIG. 4, light may enter through a window placed at 402 and exit through a window placed at 404. Alternately the light may enter through a window placed at 404 and exit through a window placed at 402.

Figure 5:
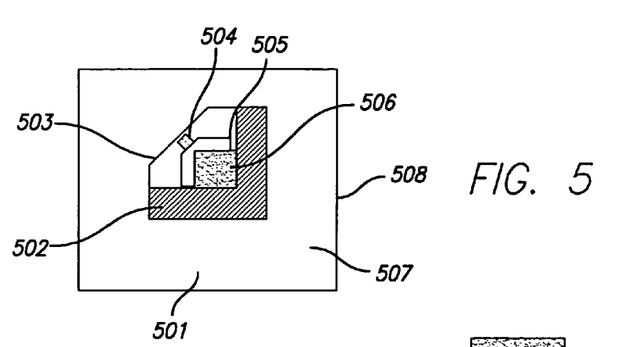
FIG. 5 is a crystal holding using a spring with resultant force along the diagonal of the crystal.

FIG. 5 illustrates holding the crystal in place using a spring. This method holds the crystal by producing a resultant force in proximity to the diagonal of the face of the crystal. Maintaining the crystal in this manner is accomplished by providing two surfaces 502 at a 90 degree angle to each other within the frame 501. Two sides of the crystal 506 are in contact with surfaces 502. A cap 505 also has two surfaces at a 90 degree angle to each other. These two surfaces are in contact with the opposing surfaces of crystal 506. Space is allowed so the cap will not come in contact with the surfaces 502 or frame 501. One surface of the cap 505 is beveled at 45 degrees to the sides of the crystal 506 and is generally aligned parallel to surface 503 of frame 501. In addition, one surface of the frame 501 is parallel or nearly parallel to the bevel on cap 505. A low force spring 504 can be used to hold the optical crystal in place. This spring 504 is made from stainless steel and may be positioned by placing a recess in the bevel of the cap. This geometry maximizes the contact area of crystal 506 with frame 501 to aid in the efficiency and uniformity of heating and cooling. It also allows for the frame 501 and optical crystal 506 to be heated or cooled over a large temperature range without increasing stress on the optical crystal 506. Exterior frame edge 508 and interior 507 of frame 501 are also shown.

Figure 6:
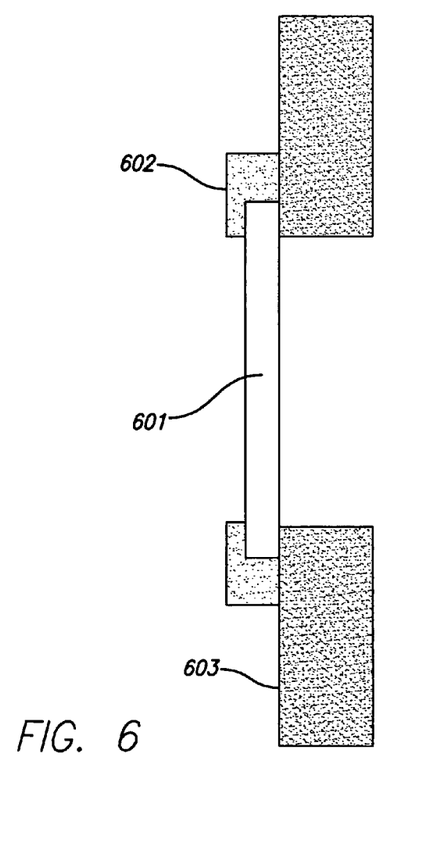
FIG. 6 shows a glass to metal seal.

FIG. 6 shows a cross section of a window using only a glass to metal seal. In this case window 601 is held against frame 603 using retaining plate 602. This type of seal is suited for extreme high temperature applications because all materials can withstand temperatures in excess of 500 degrees C. The choice of window materials depends mostly on the optical damage threshold. When an enclosure is used to generate light in the UV and DUV spectral region and the light is focused into the crystal, either fused silica or calcium fluoride can be employed. Calcium fluoride windows also allow for efficient transmission in the infra red region of the light spectrum. This can be advantageous when making measurements of the properties of the optical crystal while the crystal is in the enclosure. In practice it is difficult to get a perfect seal between the metal and the glass unless the metal is polished to an optical quality surface. However, in many cases, the positive pressure from the purge gas can be sufficient to prevent the external environment from contaminating the inside of the enclosure.

Figure 7:
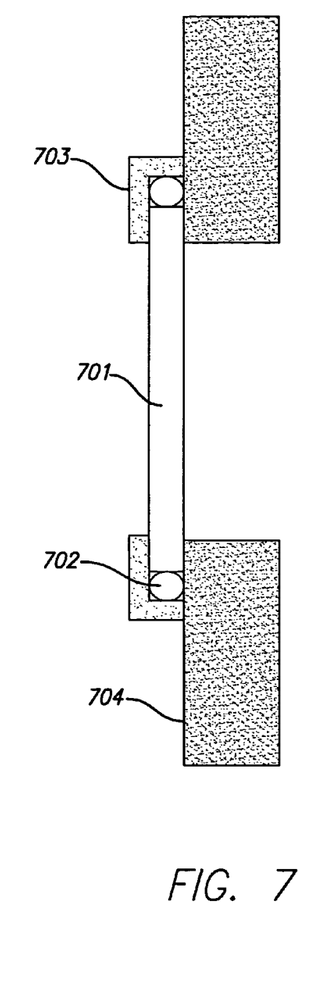
FIG. 7 illustrates a glass to metal seal primary seal with secondary ring seal.

FIG. 7 shows a cross section of a window using a primary glass-to-metal seal and a secondary ring seal. In this case a window 701 is held against frame 704 using a retaining plate 703. In addition, a ring seal 702 is placed between the edge of window 701 and frame 704. This type of seal is very good at preventing external contaminants from entering the enclosure. This design also minimizes any photocontamination from the ring seal because outgased material would have to leak through the primary glass-to-metal seal to enter the enclosure.

The choice of ring seal material is important and depends on the temperatures to which the enclosure will be raised. For applications where the ring seal will experience temperatures of less than 150 deg C., it is sufficient to use Viton or Kalrez material. For applications where the ring seal will experience between 150 deg C. and 250 deg C., high temperature Kalrez is typically used. For applications where the ring seal will experience greater than 250 deg C., a metal ring seal is likely required. This metal ring is a soft metal material so it provides an adequate seal against the glass. If the metal material is not soft, too much pressure can be required to compress the ring and the window will crack. Many different types of metal ring seal are available. Hollow circular cross sections and hollow C cross sections are available. Some material choices for the metal ring seals are copper, brass, nickel, stainless steel, silver, or gold, but other metals may be employed. Silver is a good choice because it is a soft metal and has good sealing properties. In addition it is also possible to use a silver coating on other metal ring materials to improve the seal. Other metals offer different benefits. This type of seal is well suited for high temperature applications.

Optionally, the ring seal 702 can be placed between the window and the frame 704. This is a more traditional configuration that uses a ring seal as the primary seal.

Figure 8:
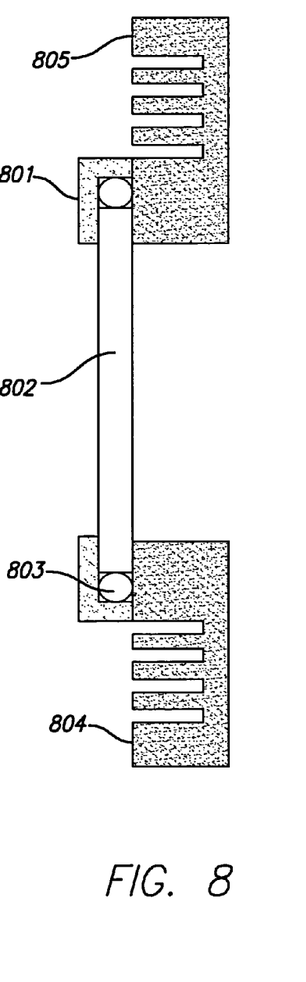
FIG. 8 is a glass to metal primary seal with o-ring secondary seal and cooling fins.

An additional embodiment for window mounting and seal is shown in FIG. 8. FIG. 8 shows a cross section of a window using a primary glass to metal seal and a secondary ring seal. In this case window 802 is held against frame 804 using retaining plate 801. In addition a ring seal 803 is placed between the edge of window 802 and frame 804. This design has additional cooling fins 805 in proximity to ring seal 803.

This design approach helps reduce the temperature of the frame in the proximity of the ring seal allowing the use of lower temperature materials for the ring seal. The ring seal typically satisfies the same conditions/constraints as described above with respect to the design of FIG. 7.

Figure 9:
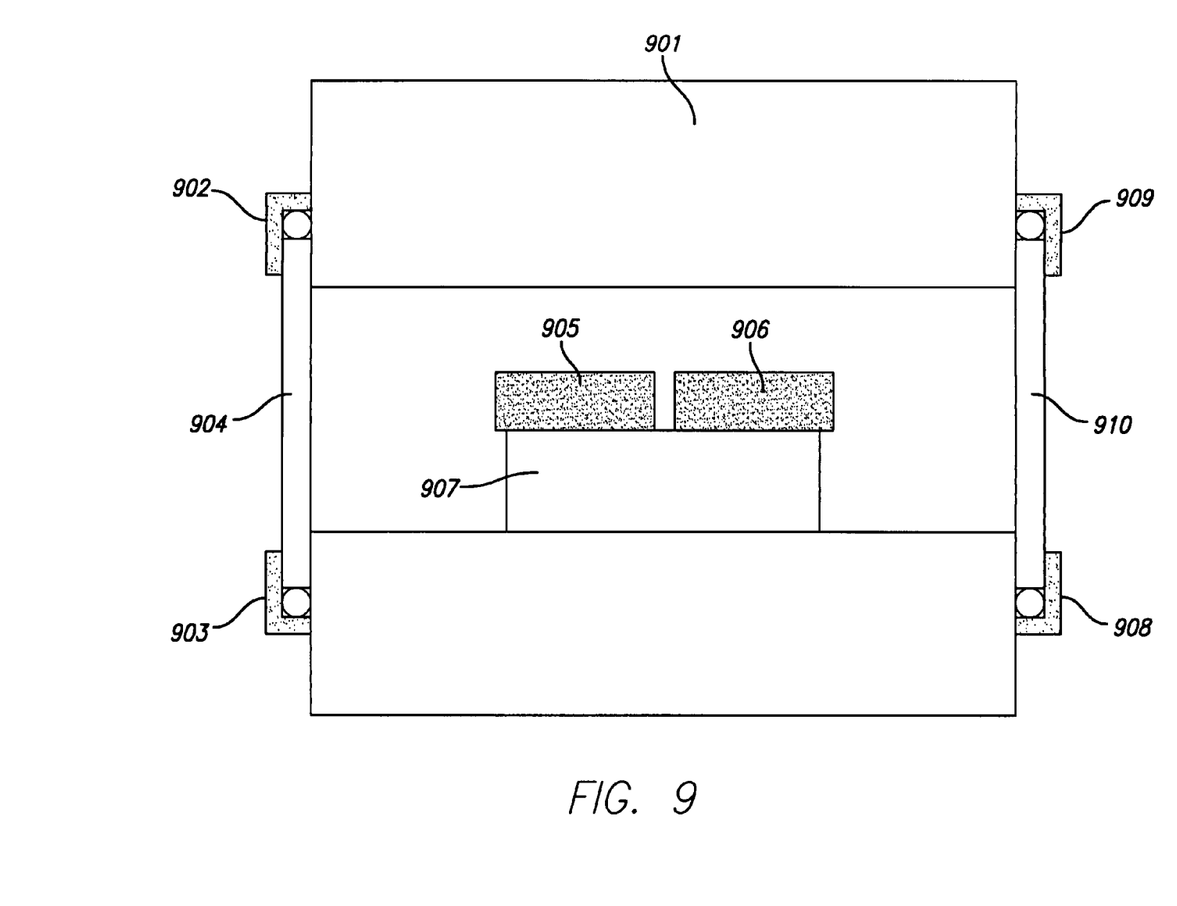
FIG. 9 shows multiple crystals in one enclosure without independent adjustment.

FIG. 9 shows an embodiment of an enclosure containing two optical crystals 905 and 906. This enclosure can employ all the features mentioned herein. The cross section drawing illustrates the components of the enclosure. Windows 904 and 910 are mounted to frame 901 using mounting plates 902 and 909. Windows 904 and 910 may be sealed using a primary glass to metal seal together with a secondary ring seal 903 and 908. Other seal types disclosed with respect to the previous embodiments may also be employed. Brewster windows can also be employed as described in previous embodiments. In addition, the windows should in most cases be placed far enough away from the crystal so they are not damaged by the light focused into the crystal or the light exiting the crystal as previously described.

The two crystals 905 and 906 are supported within the cell by recessed portion or support element 907. Both crystals can be held in place using a similar technique as is described above with respect to FIG. 5. The crystals can be of the same type or different types. When crystals of the same type are used, it can increase the frequency conversion efficiency or improve the beam shape of the light energy beam provided to the design.

Two typical methods of enhancing the beam are walkoff compensation (WOC) and distributed delta k (DDK) compensation. For WOC, the system rotates the second crystal to produce walkoff in the opposite direction to the first crystal. This can improve both efficiency and beam shape. In general, walkoff represents the situation where the intensity distribution of the beam in the crystal drifts away from the direction of the light wave vector. Thus walkoff compensation tends to decrease the walkoff for the first crystal in the two crystal arrangement. For DDK, the crystal angles are optimized for slightly different angles to optimize the conversion efficiency.

If the crystals are different types it is often to generate more than one wavelength within the same enclosure. For example, light at a wavelength of 1064 can enter the enclosure. A portion of the light is converted by a first crystal to 532 nm. Then the 532 nm light and the residual 1064 nm light can be mixed in a second crystal to produce 355 nm light. It is also possible to use more than two crystals by placing them in series.

Figure 10:
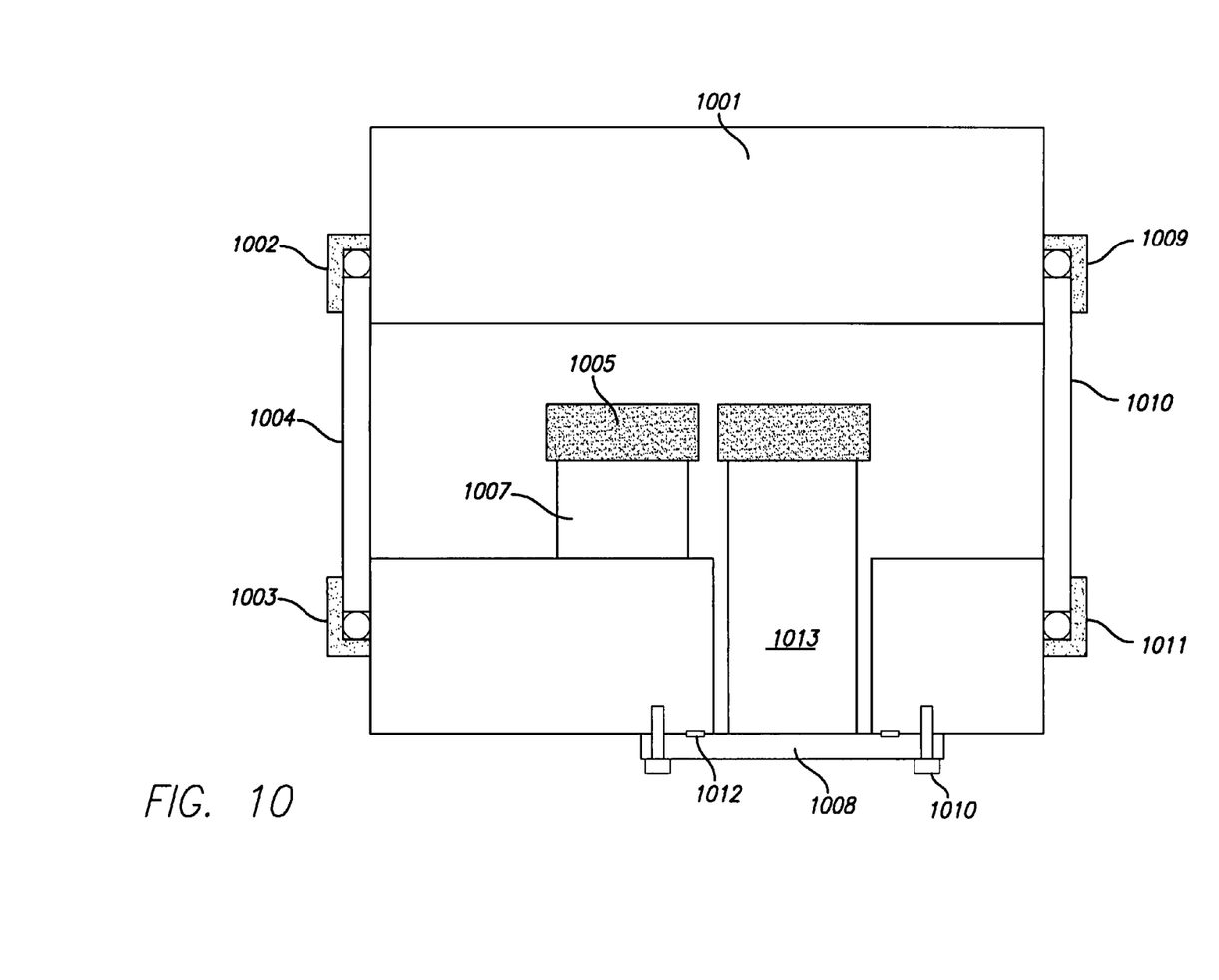
FIG. 10 illustrates multiple crystals in one enclosure with independent adjustment.

FIG. 10 shows an embodiment of an enclosure containing two optical crystals with the added ability of being able to independently align one of the crystals in the phase matching direction. This enclosure can employ all the construction features mentioned above. The cross sectional drawing illustrates the components of the enclosure. Windows 1004 and 1010 are mounted to frame 1001 using mounting plates 1002 and 1009. Windows are sealed using a primary glass to metal seal together with a secondary ring seal 1003 and 1011. Other seal types disclosed herein may alternatively be employed. Again, Brewster windows can also be employed as previously described. In addition, the windows should generally be placed far enough away from the crystal so they are not damaged by the light focused into the crystal or the light exiting the crystal as previously described.

Crystal 1005 is supported within the cell by recessed portion 1007. Crystal 1006 is supported on a pedestal 1013 that is inserted into the frame 1001. This pedestal 1013 can be sealed using a ring seal 1012. This ring seal can be similar material to the window seals in previous embodiments. In addition, because the seal here is a metal to metal interface, other types of sealing can be used, including but not limited to metal crush washers used for vacuum seals. Pedestal 1008 can be rotated with respect to crystal 1005 for appropriate alignment, and then fastened in place using external fasteners 1010. Both crystals can be held in place using a similar technique described with respect to FIG. 5.

Figure 11:
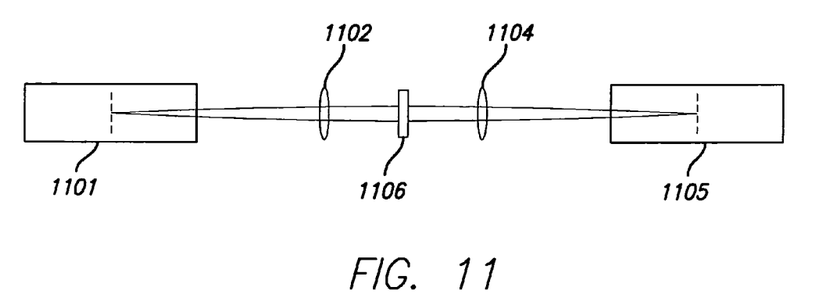
FIG. 11 illustrates two crystals with lens relay.

FIG. 11 shows an example of an optical arrangement using multiple crystals. In some cases, placement of two crystals in proximity to each other is not efficient. In a situation where two crystals must be located close to one another, an optical relay collects light from a region proximate one crystal and focuses light to a region proximate a following crystal. In practice this can be accomplished using several optical schemes. One such arrangement is shown in FIG. 11. Light from first crystal 1101 is collimated by first lens 1102. A waveplate 1103 can be used to modify the polarization of the light before the light is focused using lens 1104 into second crystal 1105. In many cases it is not necessary to modify the polarization of the light from the first crystal, and thus waveplate 1103 is optional. It is also possible to use a single lens to collect light from crystal 1101 and focus it into crystal 1105.

Figure 12:
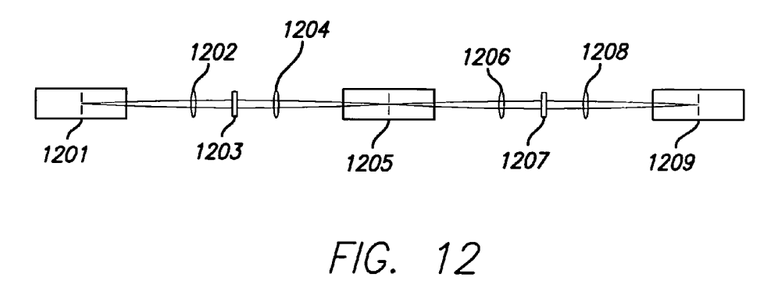
FIG. 12 represents multiple crystals within a lens relay.

FIG. 12 shows an alternate example of an optical arrangement for using multiple crystals. This example extends the example of FIG. 11 to three crystals. In practice, additional crystals can be added in a similar fashion, and three are provided here as an example and are not intended to be limiting. Light from a first crystal 1201 is collected by a first lens 1102. A waveplate 1103 can be used to modify the polarization of the light before the light is focused using lens 1204 into second crystal 1205. Lens 1206 then collects light from crystal 1205. A waveplate 1207 can be used to modify the polarization of the light before the light is focused by lens 1208 into crystal 1209.

As for the embodiment in FIG. 11, it is often not necessary to modify the polarization of the light one or more of the crystals. If polarization is not modified, waveplates 1203 or 1207 are not necessary. It is also possible to use a single lens to collect light from crystal 1201 and focus the light into crystal 1205. It is also possible to use a single lens to collect light from crystal 1205 and focus light into crystal 1209.

Figure 13:
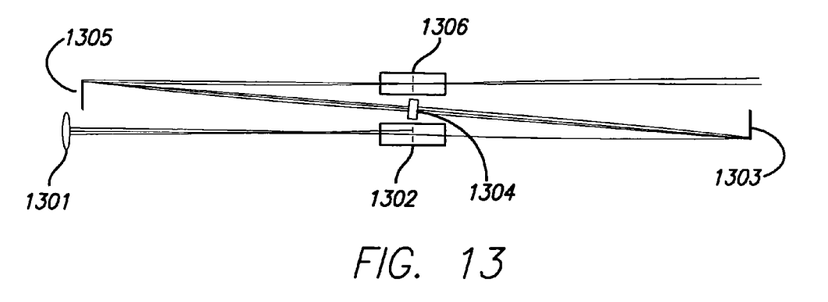
FIG. 13 is two crystals with a mirror relay.

FIG. 13 shows another example of an optical arrangement for using multiple crystals. In this case the optical relay uses mirrors instead of lenses to collect light from a region proximate to one crystal and focus the light in proximity to a following crystal. This can be beneficial in certain circumstances, such as when using high power light and UV/DUV light. When small diameter beams of high power light transmit through lens elements, absorption can change the properties of the lens. This includes local lens heating that results in changes in the focus position of the light. This phenomenon is called thermal lensing and can cause changes in the focus position of the light. This focus change can reduce the frequency conversion efficiency and change the beam profile. In addition, when high power UV/DUV light transmits through a lens, high power light can cause long term damage including compaction, scattering, color center formation, and eventually catastrophic damage. Use of mirrors can reduce these problems because there is no bulk material for the light to transmit through. Mirrors can also exhibit high damage thresholds. In addition, using a mirror geometry can make the frequency conversion system more compact and use fewer optical components. Mirrors can also be used with dichroic coatings which reflect one wavelength and transmit another. This enables the frequency converted light to be separated from residual unconverted light.

The embodiment in FIG. 13 includes a lens 1301 to focus light into a first crystal 1302. This lens could also be replaced with a mirror. Light from crystal 1302 is then collected by mirror 1303. Light from mirror 1303 then passes through waveplate 1304 and is collected by mirror 1305. Waveplate 1304 can be used to modify the polarization of the light. However, in some frequency conversion schemes such polarization modification is not necessary and waveplate 1304 is not needed. Mirror 1305 then focuses light into second crystal 1306.

Figure 14:
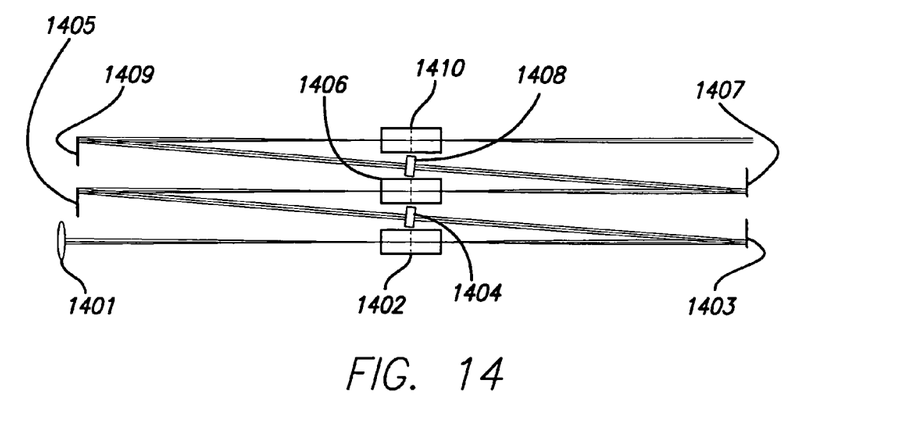
FIG. 14 shows multiple crystals with a mirror relay.

The design in FIG. 14 shows an extension of the arrangement in FIG. 13 to more than two crystals. The embodiment in FIG. 14 includes a lens 1401 to focus light into a first crystal 1402. This lens could also be replaced with a mirror. Light from crystal 1402 is then collected by mirror 1403. Light from mirror 1403 then passes through waveplate 1404 and is collected by mirror 1405. Waveplate 1404 can be used to modify the polarization of the light, and again, in some frequency conversion schemes, polarization modification is not necessary and waveplate 1404 is optional. Mirror 1405 then focuses light into second crystal 1406. In a similar manner to the light from crystal 1402, light from crystal 1406 is then collected by mirror 1407, and light from mirror 1407 passes through waveplate 1408 and is collected by mirror 1409. Waveplate 1408 can be used to modify the polarization of the light, but is optional and not needed when polarization modification is not required. Mirror 1409 then focuses light into third crystal 1410. Dichroic mirror coatings may also be used as described previously.

Figure 15:
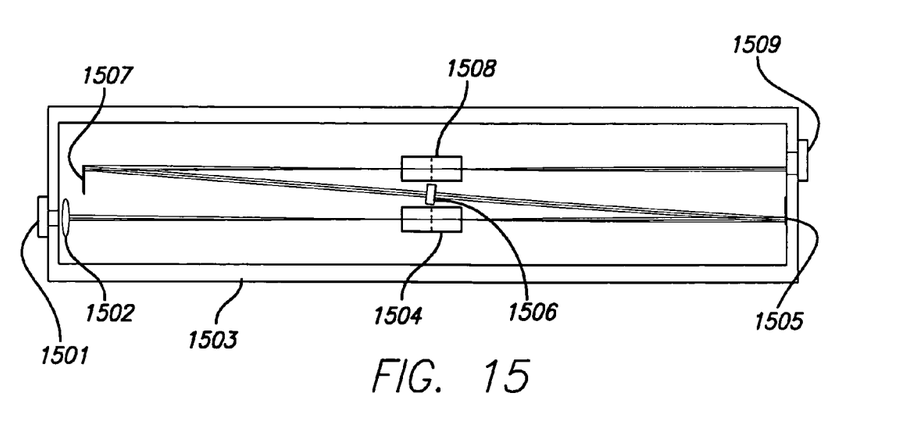
FIG. 15 represents an image relay inside an enclosure.

FIG. 15 shows an example of an enclosure that contains at least one optical crystal and optics for collecting and focusing light. The enclosure may contain optical and crystal systems similar to those shown in FIGS. 11-14. In the system of FIG. 15, light enters the enclosure through window 1501. Window 1501 is sealed to frame 1503 as described in previous embodiments. Window 1501 should be made from a material with a high enough damage threshold to endure light at expected wavelengths passing through the window. In the UV/DUV light range, fused silica and calcium fluoride are very good materials for this window application.

Light is then focused by lens 1502 into optical crystal 1504. Light from crystal 1504 is then collected by mirror 1505, and light then passes through waveplate 1506 and is collected by mirror 1507. Waveplate 1506 can be used to modify the polarization of the light if desired. Mirror 1507 then focuses light into second crystal 1508, and light exits the enclosure through window 1509. Brewster windows can also be employed as described previously, and the windows should generally be placed far enough away from the crystal so they are not damaged by the light focused into the crystal or the light exiting the crystal.

Figure 16:
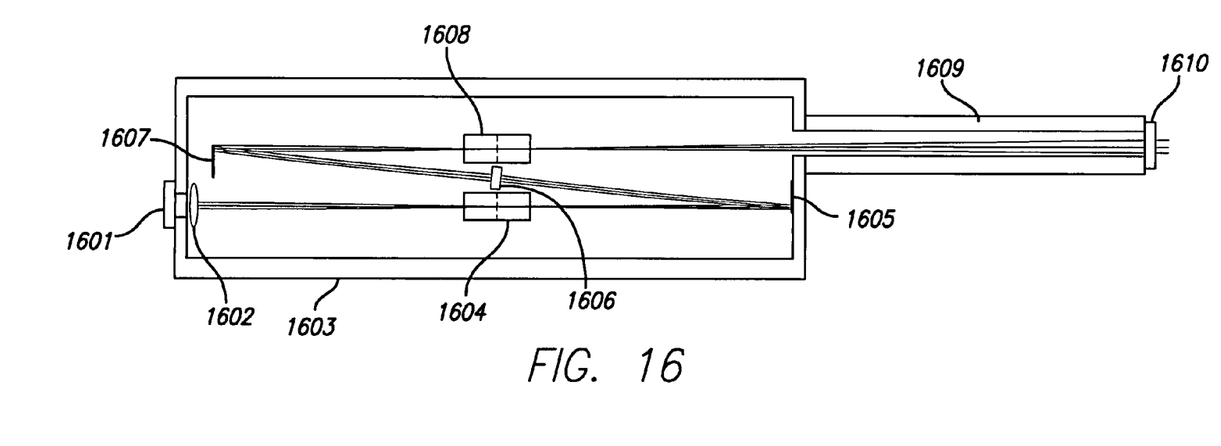
FIG. 16 illustrates multiple crystals in one enclosure with extended output.

FIG. 16 shows an alternate example of an enclosure that contains at least one optical crystal and optics for collecting and focusing light. This enclosure places the exit window a further distance from the second crystal than the design of FIG. 15, allowing the beam to diverge and reduce the light intensity on the window. This is especially important when UV/DUV wavelengths transmit through the window and can dramatically increase the lifetime of the window. The enclosure may contain optical and crystal systems similar to those shown in FIGS. 11-14.

In the system of FIG. 16, light enters the enclosure through window 1601. Window 1601 is sealed to frame 1603 as described previously. Window 1601 is made from a material with suitable high damage threshold for light at the wavelengths traveling therethrough. In the UV/DUV light range, fused silica and calcium fluoride are very good materials for this application. Light is then focused by lens 1602 into optical crystal 1604. Light from crystal 1604 is then collected by mirror 1605, passes through waveplate 1606, and is collected by mirror 1607. Waveplate 1606 can be used to modify the polarization of the light if desired. Mirror 1607 then focuses light into second crystal 1608 and light exits the enclosure through window 1610. Window 1610 is placed a distance away from crystal 1608 to allow the beam to expand and reduce the intensity of the beam using extension 1609. Extension 1609 can be a separate piece from frame 1603 or can be an integral part of frame 1603. In the case where extension 1609 is a separate piece from frame 1603, sealing can occur using the ring seal techniques described herein. Brewster windows can also be employed as described and windows should generally be placed far enough away from the crystal so they are not damaged by the light focused into the crystal or the light exiting the crystal.

Figure 17:
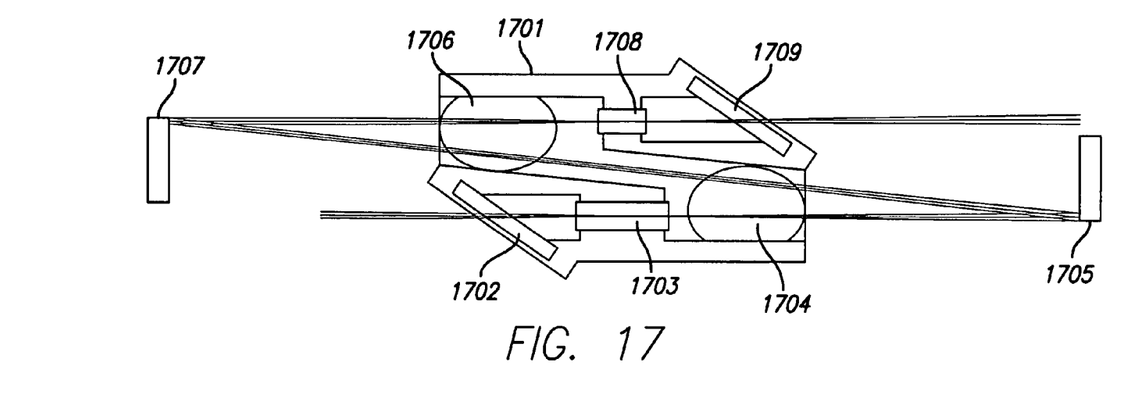
FIG. 17 shows multiple crystals in one enclosure with external optics and Brewster windows.

FIG. 17 shows an alternate embodiment of a crystal enclosure that contains the optical crystals inside the enclosure while the collection and focusing optics are provided outside the enclosure. This embodiment may employ optical and crystal arrangements similar to those shown in FIGS. 11-14. The typical method for using multiple crystals would be to use a single enclosure for one crystal and another crystal without an enclosure. These would be used with multiple collection and focusing lenses, but as a result, cost and size can be issues. Using more than one crystal usually requires separate crystal support, enclosures, and translation systems. This in combination with the associated collection and focusing lenses can produce a system that is quite large and expensive. Also, use of many frequency conversion steps can produce many wavelengths and polarization combinations. This typically requires many optics with different coatings.

The embodiment in FIG. 17 has infrared P-polarized light coming into the enclosure through window 1702. This window is sealed to the frame using techniques described herein. The window is oriented at Brewster's angle so there is no reflection loss of the P-polarized light. The entering light is focused into optical crystal 1703. A typical crystal that can be used in this location is LBO (Lithium Triborate). For example, crystal 1703 can be an LBO crystal that is noncritically phase matched to frequency double the infrared light to a visible wavelength. It can be beneficial to have one of the two crystals be noncritically phase matched so the design is less alignment sensitive. In this case, crystal 1703 uses Type I phase matching to produce visible light polarized orthogonally to the IR light. Window 1704 is oriented near Brewster's angle for the frequency converted visible light. Mirror 1705 collects the visible light from crystal 1703. Mirrors 1705 and 1707 can have dielectric coatings that are highly reflective for the visible wavelength and highly transmissive for the infrared wavelength. This allows only the visible light to reflect from mirror 1705 and residual infrared light to pass through.

Visible light then transmits through Brewster window 1704 again, through frame 1701 and through Brewster window 1706 before being collected by mirror 1707. Mirror 1707 then focuses visible light back through Brewster window 1706 and into crystal 1708. In this embodiment crystal 1708 may be a CLBO (Cesium Lithium Borate) crystal or a BBO (Barium Borate) crystal. In this embodiment crystal 1708 uses Type I phase matching to produce DUV light polarized orthogonally to the visible light. DUV light and residual visible light then pass through window 1709 oriented at Brewster's angle for the DUV wavelength. External dichroic mirrors (not shown) can be used to separate the DUV light from the visible light.

In this embodiment, other types of phase matching may be used in crystal 1703 or crystal 1708. This can produce other polarizations and require rotation of the Brewster windows by 90 degrees. Alternately, the windows can be oriented near zero degrees angle of incidence and antireflection coated. Such modifications are possible by those skilled in the art and can be considered as part of the present design.

Figure 18:
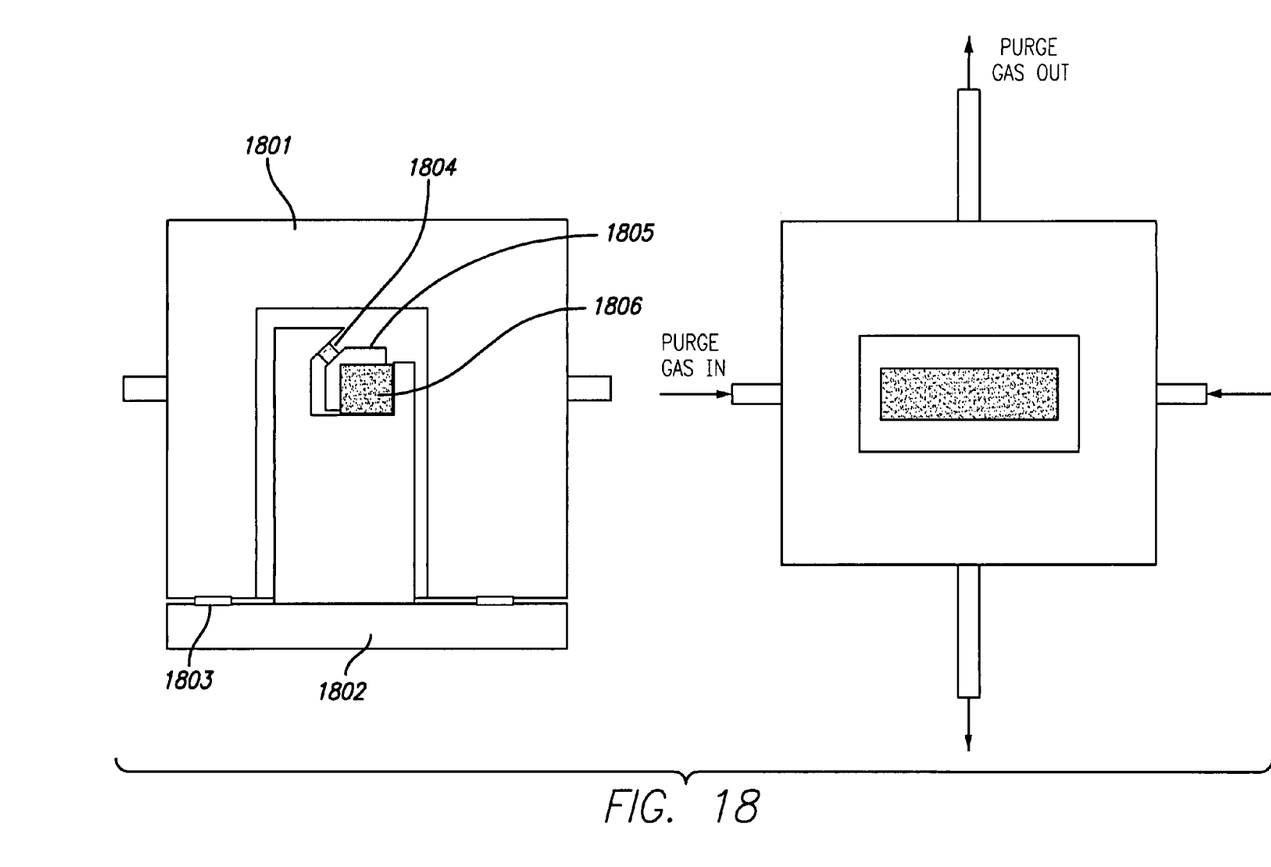
FIG. 18 represents crystal enclosures for heat processing only.

FIG. 18 shows a crystal enclosure that is only for crystal preparation before use. In many cases the crystal must be baked for an extended period of time at high temperatures. In this case it can be advantageous to have a simplified crystal enclosure optimized for high temperature processing. In this arrangement it is often not necessary to have windows to get light into and out of the crystal. This lack of a window requirement removes the complexity of making a high temperature seal between glass and metal that does not outgas and cause photocontamination.

The enclosure in FIG. 18 includes a metal frame 1801 and a pedestal 1802 for supporting the optical crystal 1806. Pedestal 1802 is sealed to frame 1802 using ring seal 1803. This ring seal is positioned between two metal surfaces and can use any of the types of seals or sealing methods described herein. In addition, a metal crush washer can be employed, since the ring seal is a seal between two metal surfaces and a large amount of clamping force can be applied. As described in previous embodiments, crystal 1806 is held in place using spring 1804 and cap 1805. This allows the crystal to be processed over an extended temperature range without producing stress that could crack the crystal. In addition, inlets and outlets are provided for purge gas to maintain the environment inside the enclosure.

Thus, in summary, an environmentally controlled enclosure comprising a crystal is provided. Multiple crystals may be provided in certain embodiments. The enclosure comprises securing hardware configured to secure the crystal within the enclosure such that temperature changes within the enclosure produce negligible stress on the crystal. The enclosure further includes a window configured to permit light to enter the enclosure and contact the crystal and may include a seal formed between the window and the enclosure.

In certain embodiments, a frame is provided for the enclosure, and an outlet configured to purge gas from the enclosure many be provided. Heating or cooling elements may be provided to control the temperature of the enclosure and the crystal or crystals provided therein, and a temperature reading element may be provided that controls temperature using feedback. The window or windows may be provided at Brewster's angle.

The crystal may be secured within the enclosure comprises a low force spring. An exit window may be provided, and windows may be fabricated from fused silica or calcium fluoride. The enclosure may be configured for built in angle adjustment along a primary phase matching axis. Angle adjustment may be provided using a goniometer with a rotation axis in proximity to a center of the crystal. The crystal can be a nonlinear crystal configured to perform frequency mixing formed from CLBO, LBO, BBO, KBBF, CBO, KDP, KTP, KD*P, or BIBO.

A seal between the window and the enclosure or frame may be provided, in some cases a primary seal and a secondary seal, configured to seal the entry window to the enclosure. The primary seal may be a ring formed from a high temperature low outgassing material. The secondary seal can comprise a ring formed from a metal comprising at least one from a group comprising silver, stainless steel, aluminum, and nickel.

Optics may be provided inside or outside the enclosure, configured to collect light from a first crystal and refocus the light in proximity of a second crystal. When multiple crystals are employed, the crystals may be oriented to perform at least one from a group comprising walkoff compensation and distributed delta k compensation.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. An environmentally controlled enclosure comprising a crystal, comprising:
    securing hardware configured to secure the crystal within the enclosure comprising a spring element and a multiple orthogonal surface cap configured to receive the spring element;
    a window configured to permit light to enter the enclosure and contact the crystal; and
    a seal formed between the window and the enclosure;
    wherein the enclosure comprises a diagonal inner surface and two orthogonal inner surfaces opposite the diagonal inner surface, and further wherein when the spring element contacts the diagonal inner surface, the multiple orthogonal surface cap maintains the crystal against the two opposite orthogonal inner surfaces.

2. The enclosure of claim 1, further comprising an outlet configured to purge gas from the enclosure.

3. The enclosure of claim 2, where the purge gas comprises an inert gas.

4. The enclosure of claim 3, wherein a percentage of the inert gas comprises oxygen.

5. The enclosure of claim 3, wherein the inert gas comprises less than 1 ppm of water or organic contaminants.

6. The enclosure of claim 1, further comprising a heating element configured to raise crystal temperature above ambient.

7. The enclosure of claim 1, further comprising a cooling element configured to lower crystal temperature below ambient.

8. The enclosure of claim 1, wherein the crystal is secured within the enclosure by a spring.

9. The enclosure of claim 1, further comprising a temperature reading element placed in proximity to the crystal.

10. The enclosure of claim 9, where the temperature reading element provides feedback to maintain the temperature of the crystal enclosure at a relatively constant temperature value.

11. The enclosure of claim 1, where the window is oriented at Brewster's angle relative to light entering the enclosure.

12. The enclosure of claim 1, further comprising an exit window associated with the enclosure configured to enable light to leave the enclosure.

13. The enclosure of claim 1, wherein the window is fabricated from one from a group consisting of fused silica and calcium fluoride.

14. The enclosure of claim 1, wherein the enclosure is configured for built in angle adjustment along a primary phase matching axis.

15. An environmentally controlled enclosure configured to house a crystal, comprising:
    a diagonal inner surface and two orthogonal inner surfaces opposite the diagonal inner surface;

means for securing the crystal within the enclosure comprising a spring element and a multiple orthogonal surface cap configured to receive the spring element; and a window configured to permit light to enter the enclosure and contact the crystal;

wherein the spring element is configured to contact the diagonal inner surface and maintain the multiple orthogonal surface cap against the crystal and position the crystal against the two opposite orthogonal inner surfaces.

16. The enclosure of claim 15, wherein the enclosure is configured with built in angle adjustment perpendicular to a primary phase matching axis.

17. The enclosure of claim 16, wherein angle adjustment occurs using a goniometer with a rotation axis in proximity to a center of the crystal.

18. The enclosure of claim 15, further comprising a primary seal configured to seal the entry window to the enclosure.

19. The enclosure of claim 18, wherein the primary seal comprises a ring formed from an outgassing material.

20. The enclosure of claim 18, further comprising a secondary seal configured to seal the entry window to the enclosure in combination with the primary seal, wherein the secondary seal comprises a ring formed from a metal selected from a group consisting of silver, stainless steel, aluminum, and nickel.

21. The enclosure of claim 15, wherein the crystal is a nonlinear crystal configured to perform frequency mixing.

22. The enclosure of claim 15, wherein the crystal is formed from one from a group of materials consisting of CLBO, LBO, BBO, KBBF, CBO, KDP, KTP, KD*P, and BIBO.

23. An enclosure configured to control an environment comprising a plurality of crystals, comprising:

at least one diagonal inner surface and at least two orthogonal inner surfaces opposite each diagonal inner surface;

hardware configured to secure the plurality of crystals within the enclosure comprising at least one spring element and a multiple orthogonal surface cap configured to receive the at least one spring element; and at least one window configured to enable light to enter and exit the enclosure;

wherein each spring element is configured to contact one diagonal inner surface and maintain the multiple orthogonal surface cap against one crystal and position the one crystal against at least two opposite orthogonal inner surfaces.

24. The enclosure of claim 23, further comprising a seal formed between the window and the enclosure.

25. The enclosure of claim 23, further comprising optics configured to collect light from a first crystal and refocus the light in proximity of a second crystal.

26. The enclosure of claim 25, wherein the optics are positioned within the enclosure.

27. The enclosure of claim 25, wherein the optics are positioned outside the enclosure.

28. The enclosure of claim 23, wherein at least one crystal is non-critically phase matched.

29. The enclosure of claim 23, wherein one crystal is configured to be independently aligned in a primary phase matching plane.

30. The enclosure of claim 23, wherein the crystals are oriented to perform at least one from a group consisting of walkoff compensation and distributed delta k compensation.

31. An enclosure configured to control an environment comprising a plurality of crystals, comprising:

a metal frame comprising a diagonal inner surface and two orthogonal inner surfaces opposite the diagonal inner surface; and a removable crystal holder comprising at least one spring element and at least one multiple orthogonal surface cap configured to receive one spring element;

wherein one spring element is configured to contact the diagonal inner surface and maintain one multiple orthogonal surface cap against one crystal and position the one crystal against the two opposite orthogonal inner surfaces.

* * * * *